(12) United States Patent
Fiore et al.

(10) Patent No.: US 11,988,107 B2
(45) Date of Patent: May 21, 2024

(54) METHOD FOR MANUFACTURING A HOUSING FOR A TURBINE ENGINE AND TOOLS FOR THE IMPLEMENTATION THEREOF

(71) Applicant: SAFRAN AIRCRAFT ENGINES, Paris (FR)

(72) Inventors: Vincent Pascal Fiore, Moissy-Cramayel (FR); Clémentine Arnold, Moissy-Cramayel (FR); Clément Bourolleau, Moissy-Cramayel (FR); Thomas Dupays, Moissy-Cramayel (FR); Serge Domingues, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 265 days.

(21) Appl. No.: 17/622,637

(22) PCT Filed: Jun. 26, 2020

(86) PCT No.: PCT/FR2020/051114
§ 371 (c)(1),
(2) Date: Dec. 23, 2021

(87) PCT Pub. No.: WO2020/260835
PCT Pub. Date: Dec. 30, 2020

(65) Prior Publication Data
US 2022/0268175 A1 Aug. 25, 2022

(30) Foreign Application Priority Data

Jun. 27, 2019 (FR) ........................... 1907058

(51) Int. Cl.
*F01D 25/24* (2006.01)
*B29D 23/00* (2006.01)

(52) U.S. Cl.
CPC ............. *F01D 25/24* (2013.01); *B29D 23/00* (2013.01); *F05D 2220/323* (2013.01); *F05D 2230/23* (2013.01); *F05D 2240/14* (2013.01)

(58) Field of Classification Search
CPC .............................. F01D 25/24; F05D 2240/14
(Continued)

(56) References Cited

U.S. PATENT DOCUMENTS

| 10,759,122 B2 | 9/2020 | Mathon et al. |
| 2003/0082024 A1 | 5/2003 | Scott |

(Continued)

FOREIGN PATENT DOCUMENTS

| CN | 103836002 A | 6/2014 |
| CN | 104438462 A | 3/2015 |

(Continued)

OTHER PUBLICATIONS

International Search Report mailed Oct. 2, 2020, issued in corresponding International Application No. PCT/FR2020/051114, filed Jun. 26, 2020, 2 pages.

(Continued)

*Primary Examiner* — James D Sells
(74) *Attorney, Agent, or Firm* — CHRISTENSEN O'CONNOR JOHNSON KINDNESS PLLC (57) ABSTRACT

A housing for an aircraft turbine engine includes an annular body extending around an axis A. The body includes a securing flange extending radially outwards at each of the axial ends thereof, and an abradable layer arranged inside the body. A method for manufacturing the housing includes a step b) of bonding the layer to the first surface, during which the housing is heated and compressed by a system present at least partially inside the housing. The method further includes, prior to step b), a step a) of mounting at least two tools between the flanges, each of the tools being (Continued)

located in a circumferential area outside the body so as to exert bearing forces in opposite axial directions on the flanges.

19 Claims, 5 Drawing Sheets

(58) Field of Classification Search
USPC .......................................................... 156/242
See application file for complete search history.

(56) References Cited

U.S. PATENT DOCUMENTS

2009/0277153 A1* 11/2009 Harper .................. F01D 11/122
156/286
2014/0294574 A1 10/2014 Charles

FOREIGN PATENT DOCUMENTS

| CN | 108194469 A | 6/2018 |
| EP | 2116695 A2 | 11/2009 |
| FR | 3060438 A1 | 6/2018 |

OTHER PUBLICATIONS

Written Opinion of the International Searching Authority mailed Oct. 2, 2020, issued in corresponding International Application No. PCT/FR2020/051114, filed Jun. 26, 2020, 6 pages.

English translation of Written Opinion mailed Oct. 2, 2020, issued in corresponding International Application No. PCT/FR2020/051114, filed Jun. 26, 2020, 6 pages.

International Preliminary Report on Patentability mailed Dec. 28, 2021, issued in corresponding International Application No. PCT/FR2020/051114, filed Jun. 26, 2020, 7 pages.

First Chinese Office Action mailed Nov. 7, 2023, issued in corresponding Chinese Patent Application No. 202080050925.0, filed Jun. 26, 2020, 4 pages.

* cited by examiner

METHOD FOR MANUFACTURING A HOUSING FOR A TURBINE ENGINE AND TOOLS FOR THE IMPLEMENTATION THEREOF

FIELD OF THE DISCLOSURE

The present disclosure relates to the field of the aircraft turbine engine casings.

The present disclosure relates in particular to the manufacture of a casing for a turbine engine, in particular of an aircraft, as well as to tools for the implementation of this method.

BACKGROUND

Figure 1:
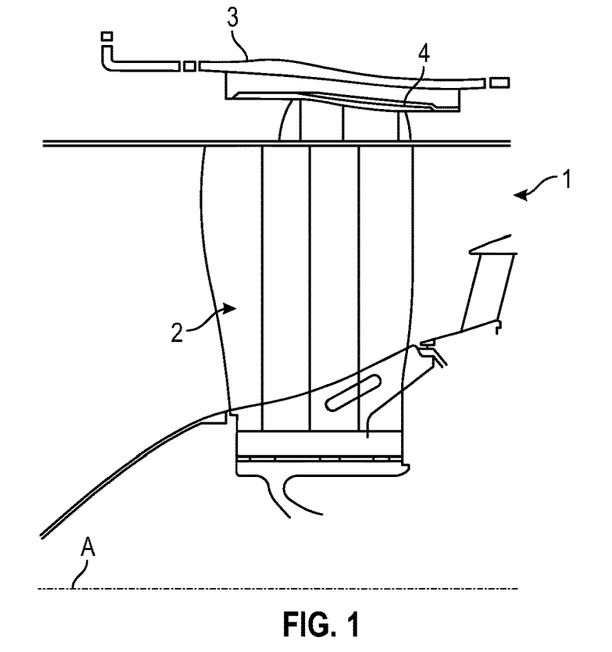
FIG. 1 is a partial schematic half-view in axial section of a fan of an aircraft turbine engine according to the prior art.
Figure 2:
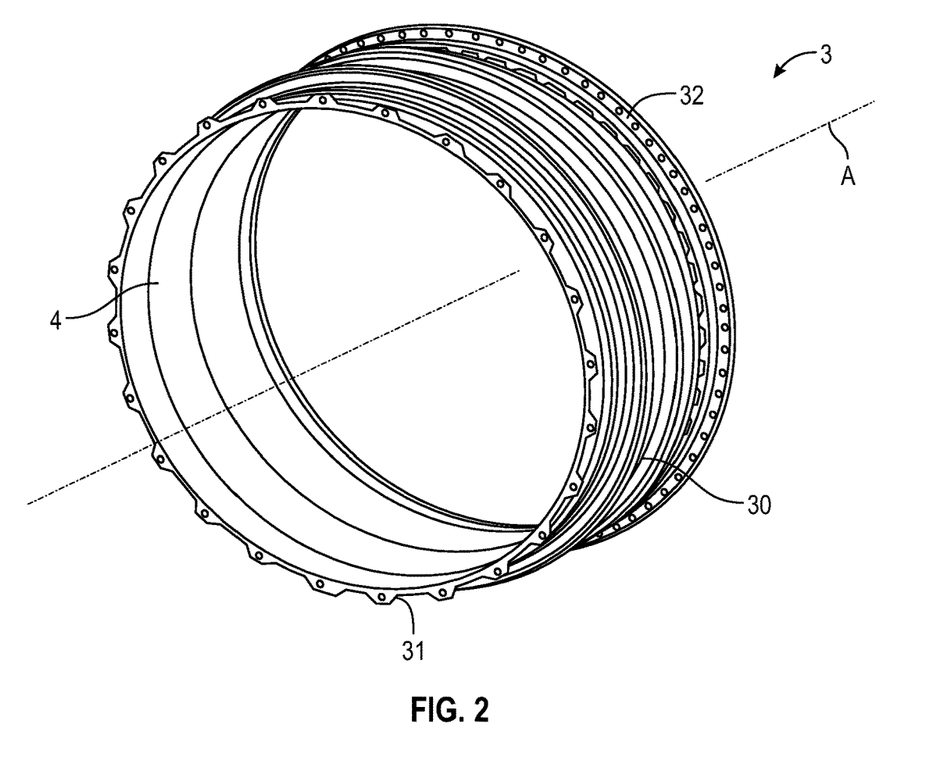
FIG. 2 is a schematic perspective view of a fan casing according to the prior art.

The prior art comprises in particular the document EP-A2-2 116 695. FIG. 1 is a partial representation of a fan of an aircraft turbine engine. In a conventional way, a turbine engine comprises from upstream to downstream, i.e. in the flow direction of the gas flows, a fan, one or more compressors, a combustion chamber, one or more turbines, and a nozzle for the ejection of the combustion gases leaving the turbine or the turbines. The fan 1 comprises a wheel of vanes 2 which is surrounded by a fan casing 3, also referred to as retention casing because of its function of retaining the vanes in case of vanes breakage or in case of debris entering into the fan. As can be seen in FIG. 2, the fan casing 3 typically comprises a substantially cylindrical body 30 of axis of revolution A which extends around the fan vanes 2 of the turbine engine. The casing comprises an annular fastening flange 31, 32 at each of its axial ends. These flanges 31, 32 are used to attach the casing 3 to annular walls of the nacelle of the turbine engine.

Figure 3:
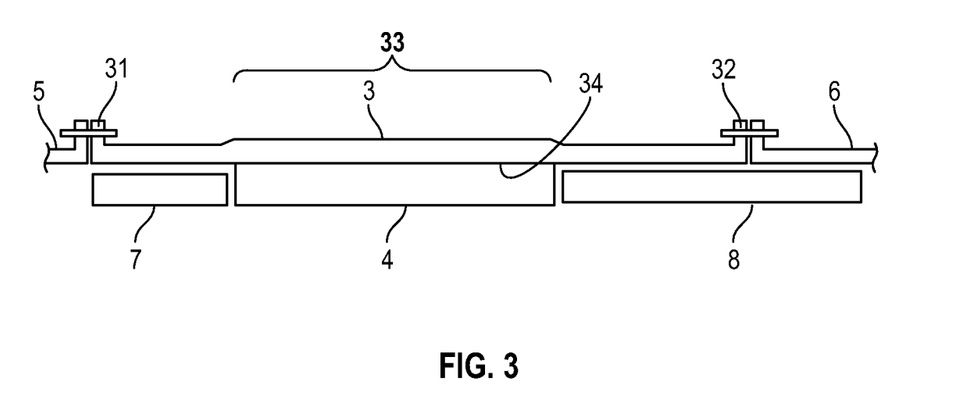
FIG. 3 is a schematic cross-sectional view of a casing according to the prior art.

FIG. 3 is a schematic cross-section illustrating a fan casing 3 according to the prior art.

The fan casing 3 is connected to an air inlet duct 5 on the one hand and to an intermediate casing shell 6 on the other. It also carries upstream acoustic panels 7 and downstream acoustic panels 8. The fan casing 3 further comprises an abradable support layer 4, positioned on an internal face 34 of the fan casing 3, between the area comprising the upstream acoustic panels 7 and the area comprising the downstream acoustic panels 8.

In addition to the retention function, the fan casing 3 is also designed to:
ensure a mechanical continuity (of forces and moments) between the air inlet duct 5 and the intermediate casing shell 6;
allow the attachment of the panels of an aerodynamic vein delimited by the abradable support layer 4, the area of the upstream acoustic panels 7 and the area of the downstream acoustic panels 8 thus ensuring a continuity of the aerodynamic vein;
allow the attachment of equipment and supports known per se;
meet the specifications of fire and leakage regulations;
allow the continuity of electric current for the lightning resistance, etc.

It is known that the body of the fan casing is manufactured of a composite material from woven fibers and embedded in a polymeric resin, the manufacturing method being of the "RTM" (Resin Transfer Molding) type. The use of such a method is particularly advantageous because it allows to produce parts with a lower overall mass than these same parts when they are manufactured of metallic material, while having a mechanical strength that is at least equivalent, if not superior.

Figure 4A:
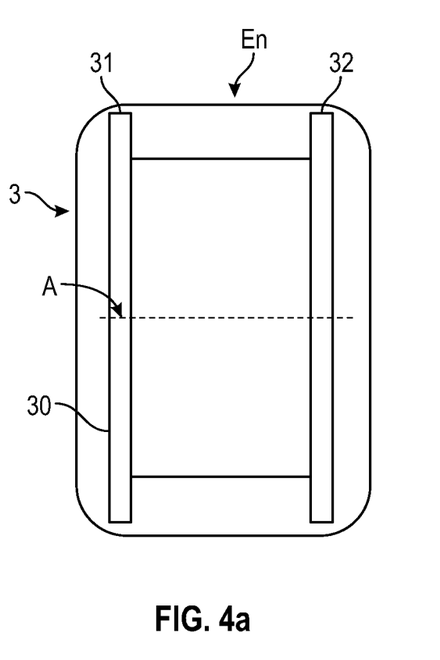
FIG. 4*a* is a very schematic side view showing a nominal state of the fastening flanges of the casing after a bonding operation.
Figure 4B:
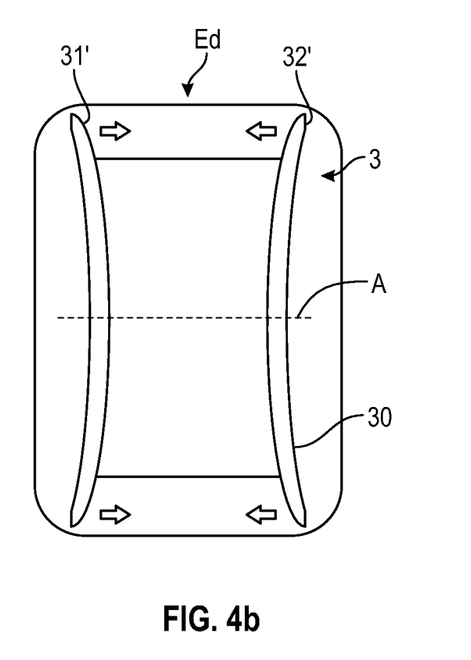
FIG. 4*b* is a very schematic side view showing a deformed state of the fastening flanges of the casing found in the prior art during a bonding operation.

However, a deformation from the theoretical nominal geometry can be observed at the outlet of the mold, i.e. when the manufactured part (the casing) is extracted. In the case of an annular fastening flange of the fan casing, a defect in relation to a theoretical circular geometry can be observed, for example in the form of the appearance of an ovality of this flange when it is extracted from the mold. For example, FIG. 4 shows schematically a nominal state "En" corresponding to the theoretical circular geometry of the fastening flanges 31, 32 and a deformed state corresponding to a curvature of the fastening flanges 31', 32' at the mold outlet of the manufactured fan casing.

Such defects can in particular be explained by the fact that residual stresses are applied to the part during its manufacture inside the mold (e.g. polymerization gradient, winding tension for a part made of composite material), and are released when the part is extracted from the mold, thus leading to a deformation of the extracted part.

In order to overcome this disadvantage, it is known to use at least one mold comprising a molding cavity whose geometry does not correspond to the nominal geometry of the part to be manufactured but to a geometry for which the deformation has been taken into account, so that when this part is extracted from the mold, the nominal geometry of the part is finally obtained. Such a method can certainly allow to compensate for the deformation of a part of revolution at the outlet of the mold. However, during the manufacture of a fan casing, the observed deformation thereof does not only occur during its extraction from the mold. The manufacture of the casing involves various successive operations, such as machining operations (e.g. trimming, drilling) and bonding (of the abradable layer or acoustic panels for example) operations.

The machining operations lead to the release of physical stresses that can cause deformations of the casing. The bonding operations are usually carried out in an autoclave. These bonding operations involve steps of heating and pressurizing the casing, followed by a step of cooling it. All of these steps also lead to the emergence of stresses acting on the deformation of the flanges of the casing. Various deformations of the casing can therefore occur throughout its manufacturing process and tend to accumulate. The prior art appears to be insufficient to counteract the deformation of the fan casing during its manufacture, since the emergence of this deformation does not only occur during the extraction of the casing from its molding cavity but also during the machining and bonding steps.

The present disclosure provides a solution to limit the risk of deformation of the fastening flanges of a fan casing during the bonding of an abradable annular layer.

During this operation, the casing is housed into an autoclave and a portion of a pressurization system is mounted inside the casing for applying a pressure to the abradable layer radially from the inside to the outside. This system is relatively cumbersome and prevents the use of solutions known in the prior art, such as that of the document FR-A1-3 060 438, consisting of providing several annular parts (rims, flasks, drums, bladders, etc.) inside the casing, which occupy all the space in the casing.

The present disclosure provides a simple, effective and economical solution to this problem.

SUMMARY

The disclosure thus proposes a method for manufacturing a casing of an aircraft turbine engine, this casing comprising:

an annular body extending about an axis A and made of a composite material comprising fibers woven and embedded in a resin, the body comprising an annular fastening flange extending radially outwards at each axial ends thereof, and an annular layer of abradable material arranged inside the body, and covering a first internal annular surface of an intermediate section of the body, the method comprising a step b) of bonding the layer to the first surface, during which the casing is heated and compressed by means of a system present at least partly inside the casing.

The method according to the disclosure comprises, prior to the step b) of heating and compressing the casing, a step a) of mounting at least two shaping tools between the flanges, each of the tools being located in a circumferential area outside the annular body of the casing so as to exert bearing forces in opposite axial directions on these flanges.

The bearing forces exerted on the flanges by the tool are intended to elastically deform at least one of the flanges so that the displacements thus obtained compensate for the deformations which will be exerted during the bonding step b). These deformations referred to as correction deformations only reposition the flanges in their original positions and shapes. Advantageously, the tools are less bulky and the tools are arranged on the outer surface of the casing. This allows, on the one hand, easy handling and movement of each tool between the circumferential areas of the annular body of the casing, and on the other hand, does not interfere with the bonding operation during which the annular body may be traversed by a portion of the system necessary for heating and/or pressurizing the casing during the step b).

The method according to the disclosure may comprise one or more of the following characteristics, considered independently or in combination with each other:

- in the step a) of the method, each tool comprises a first plate applied against a radial face of one of the flanges, a second plate applied against a radial face facing the other of the flanges, and rods for connecting the plates, the lengths of which are increased to exert the forces on the flanges;
- the lengths of the rods are adjusted by means of a manual system with knob adjuster and/or slide;
- in the step a), the first and second plates are of generally curved shape and the plates are arranged on the annular body so that their concavity is oriented towards the axis A;
- in the step a), at least one of the first and second plates comprises pins engaged in orifices of the flanges;
- in the step b), the casing is placed into an autoclave and subjected to a temperature of between 25 and 300° C., and to a pressure of between 1 and bars, for a time of between 60 and 500 minutes;
- in the step b), the casing is subjected to a temperature of between 80 and 200° C., and to a pressure of between 2 and 6 bars, for a time of between 180 and 300 minutes;
- the number of tools is at least equal to three, these tools being regularly distributed around the axis A;
- the method comprises, after the step b) of heating and compressing the casing, a step c) of dismantling and removing the tools.

The present disclosure further relates to tools configured for the implementation of the method according to any of the features of the disclosure, each of the tools comprising:

a first plate configured to be applied against a radial face of one of the flanges, a second plate configured to be applied against a radial face facing the other of the flanges, rods for connecting plates with adjustable lengths to adjust the inter-plates distance, each plate has a generally elongated and curved shape.

Each shaping tool according to the disclosure may comprise one or more of the following characteristics, taken alone from each other or in combination with each other:

- the tool is removable;
- the rods of one of the plates extend substantially radially from an internal wall of the plate to connect in the rods of the other plate in a complementary manner;
- the rods of one of the plates are connected with each other by a manual system with knob adjuster and/or slide;
- each plate has a generally curved shape;
- the circumferential extent of each plate (with respect to the axis A) is between 5 and 45°, preferably between 5 and 10°;
- the first plate and one of the rods are integral; and
- the second plate and one of the rods are integral.

DESCRIPTION OF THE DRAWINGS

The disclosure will be better understood and other details, characteristics and advantages of the present disclosure will become clearer from the following description made by way of non-limiting example and with reference to the attached drawings, in which.

DETAILED DESCRIPTION

By convention in the present application, the terms "inner" and "outer", and "internal" and "external" are used in reference to a positioning with respect to an axis A of rotation of a turbine engine. Thus, a cylinder extending along the axis A of the engine comprises an inner face directed to the axis of the engine and an outer surface opposite its inner surface. "Longitudinal" or "longitudinally" is defined as any direction parallel to the axis A, and "transversally" or "transverse" is defined as any direction perpendicular to the axis A. Similarly, the terms "upstream" and "downstream" are defined with respect to the direction of the airflow in the turbine engine.

FIGS. 1 to 3 show a fan casing 3 of an aircraft turbine engine, for example a turbojet or turboprop engine, as described previously in the technical background of the present application.

In the following description, the disclosure is applied to a fan casing 3, as illustrated in FIGS. 2 and 3 of the prior art. However, the disclosure is not limited to this type of casing and can be applied to other casings of a turbine engine.

This casing 3 to which the method according to the disclosure is applied, comprises an annular body 30 extending about an axis A of revolution. The casing 3 comprises an annular fastening flange, upstream 31 and downstream 32 respectively, extending radially outwards at each of the axial ends of its annular body 30.

In the illustrated example, the casing 3 further comprises an annular layer 4 of abradable material arranged within the body 30, and covering a first internal annular surface 34 of an intermediate section 33 of the body 30.

The body 30 of the casing may be made of a composite material comprising woven fibers and embedded in a resin.

The annular layer 4 is configured to be attached by bonding to the first internal surface 34 of the body 30 of the casing. As mentioned above, during this bonding step, the casing 3 is heated and compressed and may cause a deformation of the flange 31, 32. The flanges 31, 32 generally slope towards the body 30 which is the most massive element of the casing 3. For example, the deformation of the upstream flange 31 is manifested a sloping towards downstream of the external periphery of the flange 31, while the external periphery of the downstream flange 32 slopes towards upstream (FIG. 4).

Figure 5:
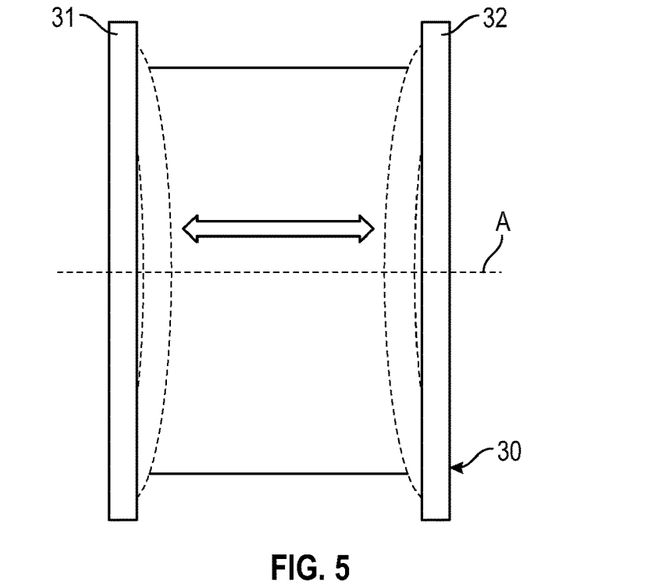
FIG. 5 is a view similar to that of FIG. 4 and showing very schematically the elastic deformation applied to the casing to compensate for the effects of the deformations, according to the method according to the disclosure.

In order to avoid this deformation, the disclosure proposes a specific tool 10 which is arranged outside the casing 3 and which allows to shape the casing 3 during the bonding operation, during which the casing 3 is subjected to a thermal treatment under pressure. Indeed, the tool 10 allows to compensate these deformations by exerting on the flanges 31, 32, prior to the heating and compression operation of the casing, bearing forces (double arrow in FIG. 5) which are oriented in opposite axial directions. These forces generate an elastic deformation allowing to correct at least partially the distortion of the flange 31, 32.

Figure 6:
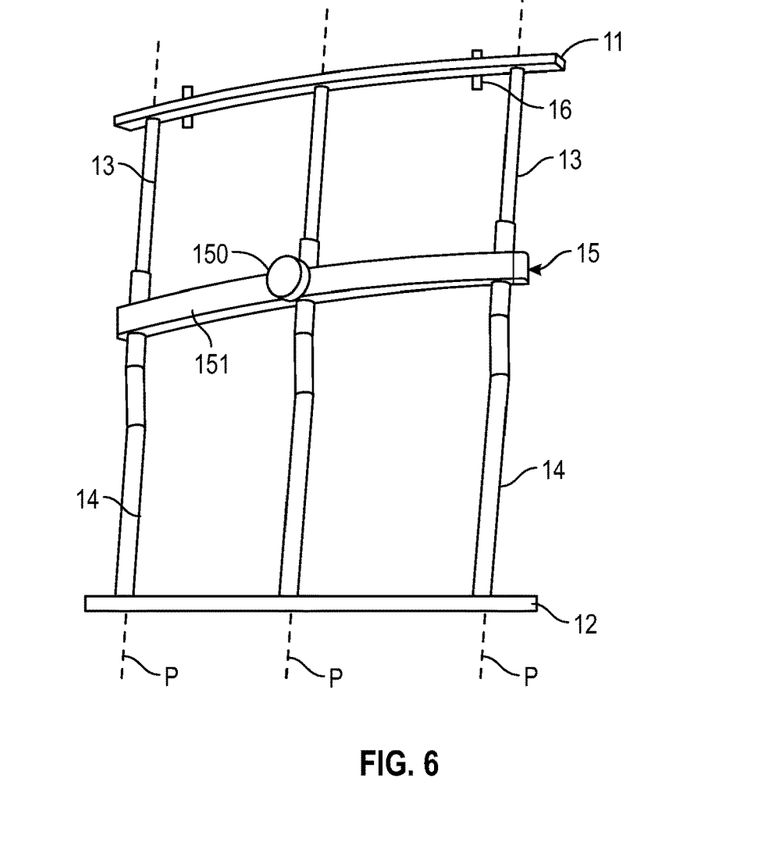
FIG. 6 is a schematic perspective view of a tool for the implementation of the method according to the disclosure.

FIG. 6 illustrates an embodiment of this tool 10 which comprises two coaxial plates 11, 12 and connecting rods 13 of the plates 11, 12 whose lengths are modifiable so that the inter-plates distance can be adjusted. The plates 11, 12 have a generally elongated and substantially curved shape. The plates 11, 12 are intended to be arranged on the body 30 so that their concavity is oriented towards the axis A. In particular, these plates 11, 12 are configured to be applied against a radial face of the flanges 31, 32. The plates 11, 12 preferably have identical or similar circumferential extents to each other. The circumferential extent of the plate 11, 12 with respect to the axis A may be between 5 and 45°, preferably between 10 and 20°.

Each plate 11, 12 is connected to at least two connecting rods 13, 14. In FIG. 6, the rods 13, 14 are three in number and are evenly distributed along the longitudinal or circumferential extent of the plate. The rods 13 and the first plate 11 are preferably integral, and the rods 14 and the second plate are preferably integral. The rods 13 can be mounted telescopically into the rods 14. Each rod 13, 14 extends substantially in a plane P. The plane P is substantially parallel to the axis A. Thus, the rods 13 of the first plate 11 slide telescopically into the rods 14 of the second plate 12, each along a sliding axis. This sliding axis passes substantially along the plane P. For example, the rods of at least one of the plates are tubular so that the rods of the other plate engage in the tubular openings of these tubular rods. In FIG. 6, the rods 13 are at least partially inserted into the rods 14 of the second plate 12. In an embodiment not shown, the ends of the rods may be threaded so as to make screw connections with the rods of the other plate.

Furthermore, the tool 10 comprises a system 15 allowing an adjustment of the lengths of the rods 13, 14 between the plates 11, 12. The system 15 may comprise the rods of one of the plates, in particular the rods 14 of the second plate 12 in FIG. 6, and a part 151 connecting the rods together. The part 151 comprises a locking and/or sliding connection knob adjuster 150. Thus, this system 15 can be realized manually or by a slide. In the first case, the lengths of the rods are adjusted by manually moving the rods 13 towards or away from the rods 14 of the second plate 12, and then the knob 150 is used to lock the adjusted rods to the desired lengths (FIG. 6). In the second case (not shown in the figures), the lengths of the rods are adjusted by sliding the rods, which are connected to each other by the sliding connection, and locking them to the desired lengths. The adjustment system 15 can be fitted or integrated into the rods of one of the plates.

Advantageously, at least one of the plates 11, 12 comprises pins 16. The pins 16 may be fitted to the plate 11, 12 or may be formed integral with the plate 11, 12 during its machining. These pins 16 are configured to engage with orifices 37 in the flanges 31, 32 so as to secure the tool 10 in a circumferential direction to the body 30 of the casing. According to an embodiment not shown in the figures, the pins 16 may be formed by the ends of the rods 13, 14 which pass through the plates 11, 12 and may be inserted into the orifices 37 of the flanges 31, 32. These pre-existing orifices 37 are advantageously those intended to receive the screws for attaching the impeller 2 to another stator element of the turbine engine. The present disclosure uses some of these orifices 37 to temporarily connect the tool 10 onto the flanges of the casing 3.

The tool 10 of the disclosure may be made of a metal alloy, such as steel.

Figure 7:
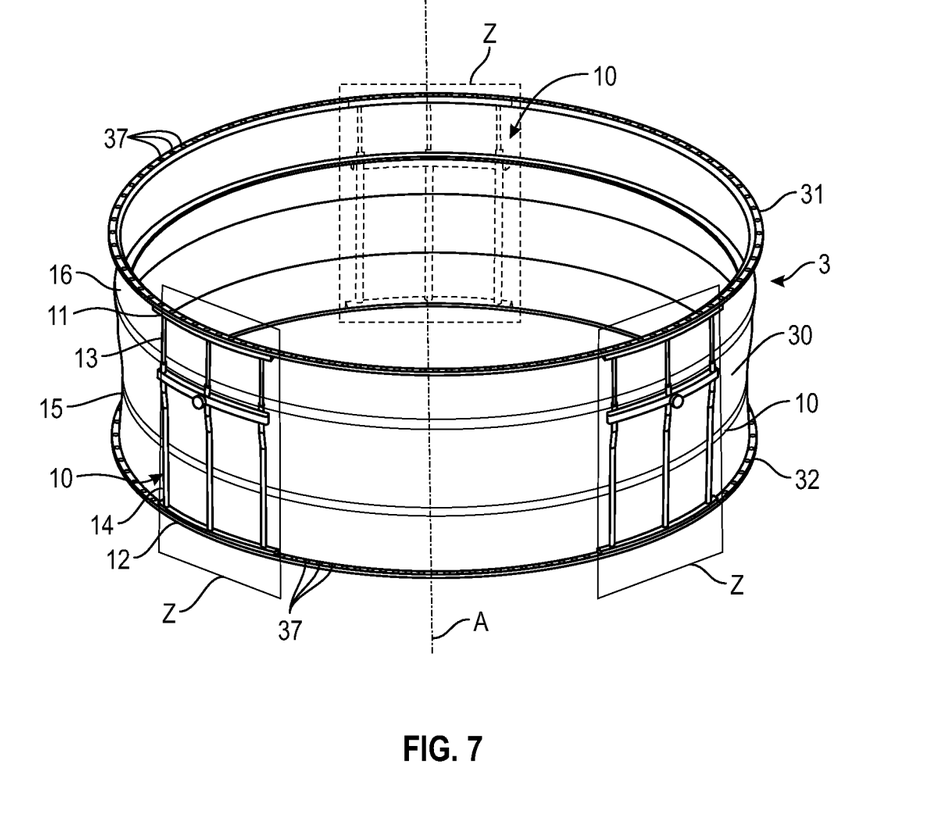
FIG. 7 is a schematic perspective view of a casing according to the disclosure which is equipped with several tools of FIG. 6.
Figure 8:
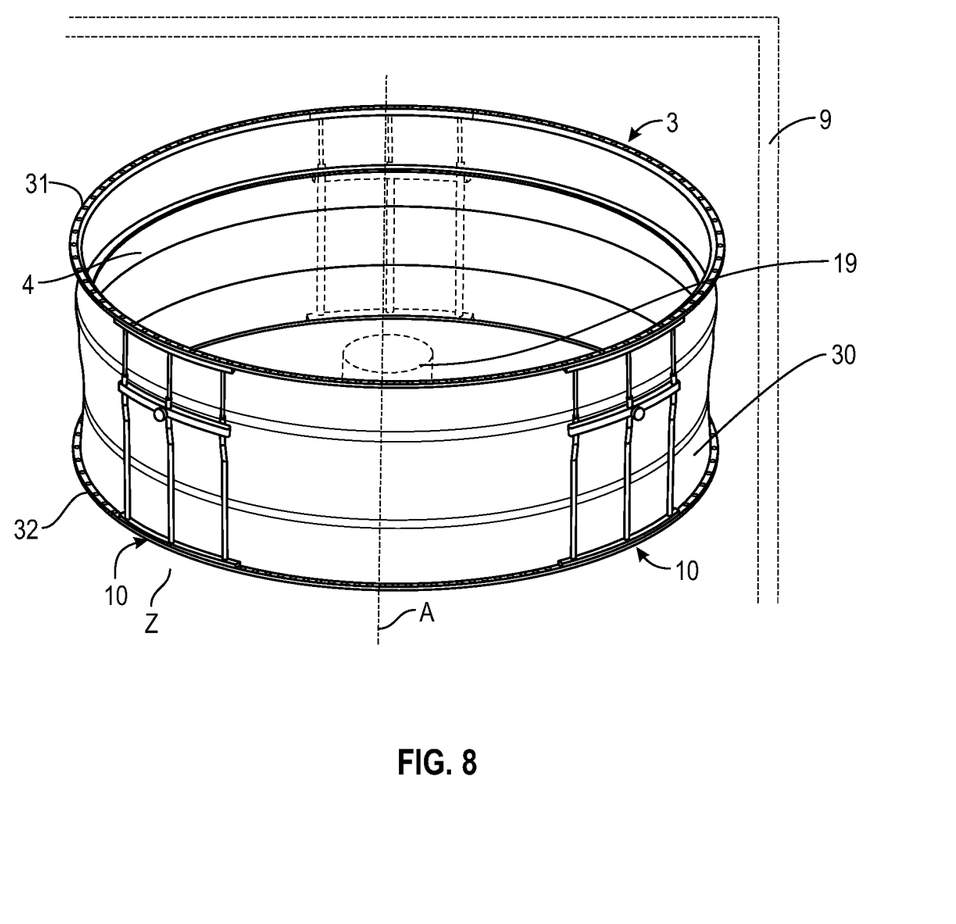
FIG. 8 is a schematic perspective view of the casing equipped with tools of FIG. 7, during a step b) of bonding of the method according to the disclosure.

The steps of the manufacturing method according to the disclosure are described with reference to FIGS. 7 to 8.

To carry out the steps of the manufacturing method of the disclosure, the present disclosure uses a casing 3, shaping tools 10 according to the disclosure, an autoclave 9 and a pressurization system 19.

In practice, during the bonding operation, the casing 3 is placed into the autoclave 9 so that its axis A is oriented vertically. The system 19 is mounted inside the casing 3, the system 19 being schematically shown in FIG. 9 and occupies a portion of the internal space of the casing 3. The tool 10 is designed to take this constraint into account.

Thus, a first step a) of the method of the disclosure consists in mounting the tools 10 on the external circumferential surface of the body 30 of the casing 3, between the flanges 31, 32. For this purpose, at least two tools 10 are evenly distributed in circumferential areas Z outside the body 30 (visible in FIG. 7) so as to homogenize the bearing forces around the flanges. In the illustrated example, the number of tools 10 is three.

The first plate 11 of each tool 10 is applied against a radial face of the flange 31 and the second plate 12 is applied against a radial face facing the other flange 32. For this purpose, each tool 10 is manipulated by an operator so as to increase the length of the rods 13, 14 in order to exert the necessary bearing forces on the flanges 31, 32, as described in the foregoing. The lengths of the rods 13, 14 can be adjusted by means of the manual system with knob adjuster 150 and/or slide.

In order to guarantee a precise positioning of the tools 10 on the casing 3, it is also possible to align the pre-existing orifices 37 of the flanges 31, 32 with the pins 16 of the tools 10.

Finally, pins 16 of the plates 11, 12 are engaged in the orifices 37 of the flanges 31, 32, so as to lock, at least temporarily, the tools assembly to the casing.

In a particular example of implementation of the disclosure, the assembly of tools 10 equipped on the casing 3, has a total weight of between 8 and 15 kg.

A second step b) of the method of the disclosure consists in bonding the abradable layer 4 to the internal surface 34 of the intermediate section 33 of the casing 3. During this step b), the casing 3 is placed into the autoclave 9 and a portion of the system 19 is installed inside the casing (FIG. 8). The casing 3 in the step b) may be subjected to a pressure of between 1 and 10 bar, and preferably between 2 and 6 bar. This pressurization can be achieved by subjecting the casing to a vacuum, for example between two annular elements arranged respectively inside the abradable layer and outside the envelope. The casing 3 can be subjected to a temperature of between 25 and 300° C., and preferably between 80 and 200° C. This operation can be realized during a cycle lasting between 60 and 500 minutes, and preferably between 180 and 300 minutes.

At the end of this step b), the temperature and the pressure to which the casing 3 is subjected are lowered. After the casing 3 has cooled down completely, the abradable layer 4 is bonded and attached to the internal surface 34, and the tools 10 can be dismantled and removed.

The disclosure brings advantages on several levels. From a technical point of view, there is no longer any need to carry out integration studies depending on the state of deformation of the flanges of the casing to match its final nominal operating state in a turbine engine. From an industrial point of view, there is no longer any need for custom machining of the faces of the flanges or for reworking in the event of excessive deformation. The manufacture and the assembly of the casing is simplified, as is its three-dimensional control.

The disclosure thus allows to improve the mechanical and aerodynamic performance of the casing, as well as its manufacturing method and to gain in overall cycle time.

The invention claimed is:

1. A method for manufacturing a casing of an aircraft turbine engine, said casing comprising:
   an annular body extending around an axis (A) and made of a composite material comprising fibres woven and embedded in a resin, said body comprising an annular fastening flange extending radially outwards at each axial ends thereof, and
   an annular layer of abradable material arranged inside said body, and covering a first internal annular surface of an intermediate section of said body,
   the method comprising a step b) of bonding the layer to the first surface, during which the casing is heated and compressed by a system present at least partly inside the casing,
   the method further comprising, prior to the step b) of heating and compressing the casing, a step a) of mounting at least two shaping tools between the flanges, each of the tools being located in a circumferential area outside the body so as to exert bearing forces in opposite axial directions on these flanges.

2. The method according to claim 1, wherein in the step a) of the method, each tool comprises a first plate applied against a radial face of one of the flanges, a second plate applied against a radial face facing the other of the flanges, and rods for connecting said plates, the lengths of which are increased to exert said forces on the flanges.

3. The method according to claim 2, wherein the lengths of the rods are adjusted by a manual system with knob adjuster and/or slide.

4. The method according to claim 2, wherein in said step a) said first and second plates are of curved shape and said plates are mounted on the annular body so that their concavity is oriented towards the axis (A).

5. The method according to claim 1, wherein in said step a) at least one of said first and second plates comprises pins engaged in orifices of the flanges.

6. The method according to claim 1, wherein in said step b), the casing is placed into an autoclave and subjected to a temperature of between 25 and 300° C., and to a pressure of between 1 and 10 bars, for a time of between 60 and 500 minutes.

7. The method according to claim 1, wherein in said step b), the casing is placed into an autoclave and subjected to a temperature of between 80 and 200° C., and to a pressure of between 2 and 6 bars, for a time of between 180 and 300 minutes.

8. The method according to claim 1, wherein the number of tools is at least equal to three, these tools being regularly distributed around the axis (A).

9. The method according to claim 1, wherein the method further comprises, after the step b) of heating and compressing the casing, a step c) of dismantling and removing the tools.

10. Tools configured for the implementation of the method according to claim 1, each of the tools comprising:
    a first plate configured to be applied against a radial face of one of the flanges,
    a second plate configured to be applied against a radial face facing the other of the flanges, and
    rods for connecting the plates, the lengths of which are adjustable so that the inter-plates distance can be adjusted, wherein each plate has an elongated and curved shape.

11. The tools according to claim 10, wherein the rods of one of the plates are slidably mounted into the other rods of the other plate.

12. The tools according to claim 10, wherein the rods of one of the plates are connected with each other by a manual system with knob adjuster and/or slide.

13. The tools according to claim 10, wherein each plate has a length corresponding to an angle of between 5 and 45° with respect to the axis (A).

14. The tools according to claim 10, wherein the first plate and one of the rods are integral and/or the second plate and one of the rods are integral.

15. The tools according to claim 10, wherein each tool further comprises a system configured to adjust lengths of the rods between the plates, said system comprising the rods of one of the plates and a part connecting the rods together.

16. The tools according to claim 15, wherein the part comprises a locking and/or sliding connection knob adjuster.

17. The tools according to claim 15, wherein the part extends along a perpendicular plane in respect to the rods.

18. The tools according to claim 15, the system is fitted or integrated into the rods of one of the plates.

19. The tools according to claim 10, wherein the rods are three in number and are regularly distributed along a circumferential extent of the plates.

\* \* \* \* \*